United States Patent [19]

Dehling

[11] Patent Number: 5,113,038

[45] Date of Patent: May 12, 1992

[54] CABLE SPLICE ASSEMBLY FOR CONNECTING AND BRANCHING CABLES, PARTICULARLY TELECOMMUNICATION CABLES

[75] Inventor: Helmut Dehling, Dorsten, Fed. Rep. of Germany

[73] Assignee: Stewing Kunststoffbetrieb GmbH, Dorsten, Fed. Rep. of Germany

[21] Appl. No.: 590,348

[22] Filed: Sep. 28, 1990

[30] Foreign Application Priority Data

Sep. 30, 1989 [DE] Fed. Rep. of Germany ....... 3932734
Dec. 14, 1989 [DE] Fed. Rep. of Germany ....... 3941268

[51] Int. Cl.⁵ ........................................... H02G 15/13
[52] U.S. Cl. .................. 174/92; 174/77 R; 174/93
[58] Field of Search ............ 174/92, 93, 77 R, 76

[56] References Cited

U.S. PATENT DOCUMENTS

| | | | |
|---|---|---|---|
| 4,558,174 | 12/1985 | Massey | 174/92 |
| 4,808,772 | 2/1989 | Pichler et al. | 174/91 |
| 4,933,512 | 6/1990 | Nimiya et al. | 174/92 |

FOREIGN PATENT DOCUMENTS

| | | | |
|---|---|---|---|
| 2432420 | 1/1976 | Fed. Rep. of Germany | 174/77 R |
| 2743937 | 4/1979 | Fed. Rep. of Germany | 174/93 |
| 3616535 | 11/1987 | Fed. Rep. of Germany | 174/93 |
| 3739714 | 2/1989 | Fed. Rep. of Germany | 174/77 R |
| 170309 | 7/1989 | Japan | 174/77 R |

Primary Examiner—Morris H. Nimmo
Attorney, Agent, or Firm—Toren, McGeady & Associates

[57] ABSTRACT

A cable splice assembly for connecting and branching cables, particularly telecommunication cables. The splice assembly includes a longitudinally divided pipe sleeve and longitudinal sealing element between the abutting edges of the pipe sleeve. Transversely divided sealing members surrounded by the pipe sleeve are arranged at the ends of the pipe sleeve. The sealing members have cable passage openings adaptable to different cable diameters. The circumferential sealing elements are pressed in circumferential locking grooves between the pipe sleeve and sealing member. The circumferential sealing elements are divided O-type sealing rings with sealing tongues at the ends thereof. The O-type sealing rings have two sealing projections which engage in the abutting area of the sealing member halves. The sealing projections have locking recesses. At least one of the sealing member halves has at the locking groove a bearing bed for receiving the overlapping sealing tongue and at the abutting edge a bearing recess with a locking nose which engages the blocking recess of the sealing projection which is inserted in the bearing recess.

9 Claims, 6 Drawing Sheets

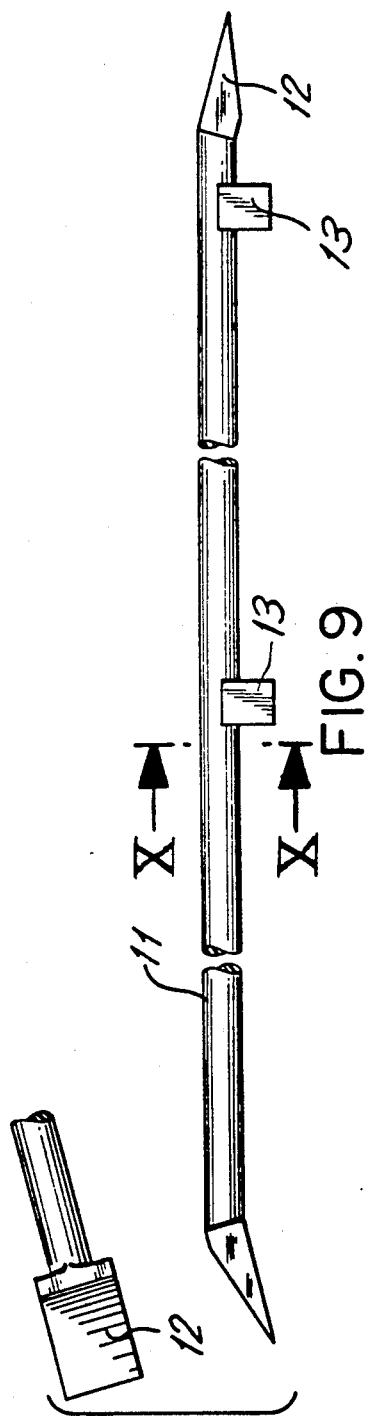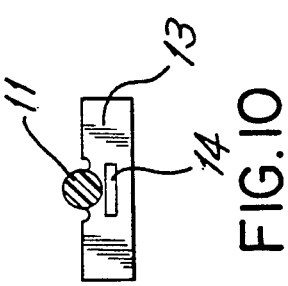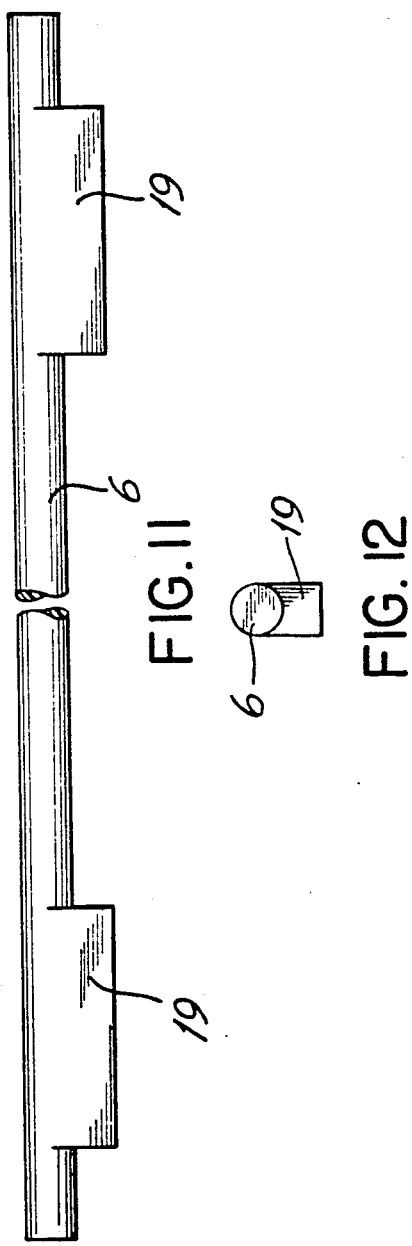
FIG. 9
FIG. 10
FIG. 11
FIG. 12

CABLE SPLICE ASSEMBLY FOR CONNECTING AND BRANCHING CABLES, PARTICULARLY TELECOMMUNICATION CABLES

BACKGROUND OF THE INVENTION

1. Field of the Invention

The present invention relates to a cable splice assembly for connecting and branching cables, particularly telecommunication cables, of different diameters. The cable splice assembly includes a longitudinally divided pipe sleeve, a longitudinal sealing element which can be pressed between the abutting edges of the longitudinally divided pipe sleeve. Transversely divided sealing members surrounded by the pipe sleeve are arranged at the ends of the pipe sleeve. The sealing members have cable passage openings which can be adapted to different cable diameters. Circumferential sealing elements can be pressed in circumferential locking grooves between the pipe sleeve and the sealing members.

2. Description of the Related Art

In cable splice of the above-described type, the problem-free sealing of the pipe sleeve relative to the sealing members and to the outside is always a problem. This is because the assembly of the pipe sleeve closing of the pipe sleeve are usually carried out on location under relatively difficult conditions. In this connection, it is known to use plastic sealing material between the sealing surfaces of pipe sleeve and sealing member. However, the distribution of the plastic sealing material is difficult and time-consuming. Also, the steps required for obtaining a problem-free sealing action are frequently not carried out with the necessary care.

The use of single-piece sealing rings is also known in the art. However, in this case, the entire sealing members or at least the regions of the sealing members in the locking groove must be elastically deformable. In some cases, additional plastically deformable sealing rings are used. In any case, the measures previously employed for sealing the joints between the pipe sleeve and the sealing members are unsatisfactory.

SUMMARY OF THE INVENTION

It is, therefore, the primary object of the present invention to provide a cable splice assembly for connecting and branching cables, particularly telecommunication cables, of different diameters, in which a problem-free sealing action between the pipe sleeve and sealing members can be achieved during assembly quickly and uncomplicated with simple means.

In accordance with the present invention, in a cable splice assembly of the above-described type, the circumferential sealing elements are divided O-type sealing rings with sealing tongues which overlap at the ends where the sealing rings are divided. The O-type sealing rings each have two sealing projections which engage on both sides in the abutting area of the sealing member halves. The sealing projections have locking recesses. At least one of the sealing member halves has in the region of the locking groove a bearing bed for the overlapping sealing tongues and on both sides in the abutting range a bearing recess with a locking nose which engages the locking recess of the sealing projection which is inserted in the bearing recess and finally pressed into the bearing recess.

The present invention is based on the finding that the pipe sleeve can be sealed relative to the sealing members mounted in the pipe sleeve in a manner which is easy to assemble and safe to operate, if divided O-type sealing rings are used and the O-type sealing rings are fixed during the assembly, while additionally a problem-free sealing is possible also in the area where the O-type sealing rings are divided. The problem-free sealing in the area of division is possible because of the overlapping sealing tongues for which the blocking grooves are provided with a separate bearing head. The locking noses in the bearing recesses which engage in the locking recesses effect locking of the O-type sealing rings which is required for a problem-free assembly. Since the bearing recesses are provided on both sides in the abutting region of the sealing member halves, a problem-free joint seal relative to the pipe sleeve is simultaneously achieved by the sealing projections of the O-type sealing rings which engage and finally are pressed in the sealing member halves.

In accordance with another important feature of the present invention, the sealing tongues are conically overlapping tongues and are also pressed into the bearing bed during the assembly of the pipe sleeve so as to provide a sealing effect. Preferably the sealing projections which are integrally formed in the manner of wings to O-typed sealing rings not only seal the abutting portions between the sealing member halves, but additionally an injection chamber which extends to the bearing recess and serves for the pressure-tight sealing of the cable passing through the pipe sleeve.

In accordance with a proposal of the invention with independent significance, the longitudinal sealing element of the socket pipe which is also constructed as an O-type sealing ring has integrally formed attachments in the areas of intersection with the circumferential sealing elements or O-type sealing ring of the sealing members. The attachments can be pressed against the circumferential sealing element. As a result, a problem-free sealing effect is obtained between the pipe sleeve and sealing members and vice-versa even in the critical intersection areas of the longitudinal division of the pipe. This sealing effect is further optimized by the fact that the attachments are simultaneously located in the areas of the sealing projections of the circumferential sealing elements and, thus, in the areas of the bearing recesses between the abutting surfaces of the sealing member halves. Consequently, a particularly compact compression of the sealing material is obtained in the intersection areas of longitudinal sealing elements and circumferential sealing elements.

In order to obtain an excellent pipe sleeve, the invention further provides that the pipe sleeve has at both ends thereof inwardly projecting centering noses. These centering noses either contact corresponding centering attachments integrally formed on the end faces of the sealing member in order to secure the pipe sleeve against rotation. The centering noses may also engage in corresponding centering recesses. Accordingly, centering of the pipe sleeve additionally has the result that the longitudinal sealing elements and the circumferential sealing elements actually intersect and are compressed in the region of the sealing projections at the circumferential sealing elements or the bearing recesses between the sealing member halves.

In accordance with another preferred feature, the pipe sleeve has an elliptic cross-section and the sealing members are disks which have a corresponding elliptic shape. As a result, the cable splice assembly according to the present invention not only provides sufficient internal space for connecting and branching conventional cables, but space is also provided particularly for splice boxes and bending radii as they are used or prescribed when placing glass fiber cables. Consequently, the cable splice assembly according to the present invention can be used for connecting and branching conventional telecommunication cables as well as glass fiber cables.

In addition, portions of the pipe sleeve may have stiffening corrugations which extend in longitudinal direction of the pipe and/or internal stiffening ribs which extend in circumferential direction. This prevents buckling under pressure which occurs when cables are sealed pressure-tight.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 9 is a view of a circumferential sealing element of the cable splice assembly of FIG. 1;

FIG. 10 is a sectional view taken along sectional line X—X of FIG. 9;

FIG. 11 is a view of a longitudinal sealing element of the cable splice assembly of FIG. 1; and FIG. 12 is a front view of the longitudinal sealing element of FIG. 11.

DESCRIPTION OF THE PREFERRED EMBODIMENT

Figure 1:
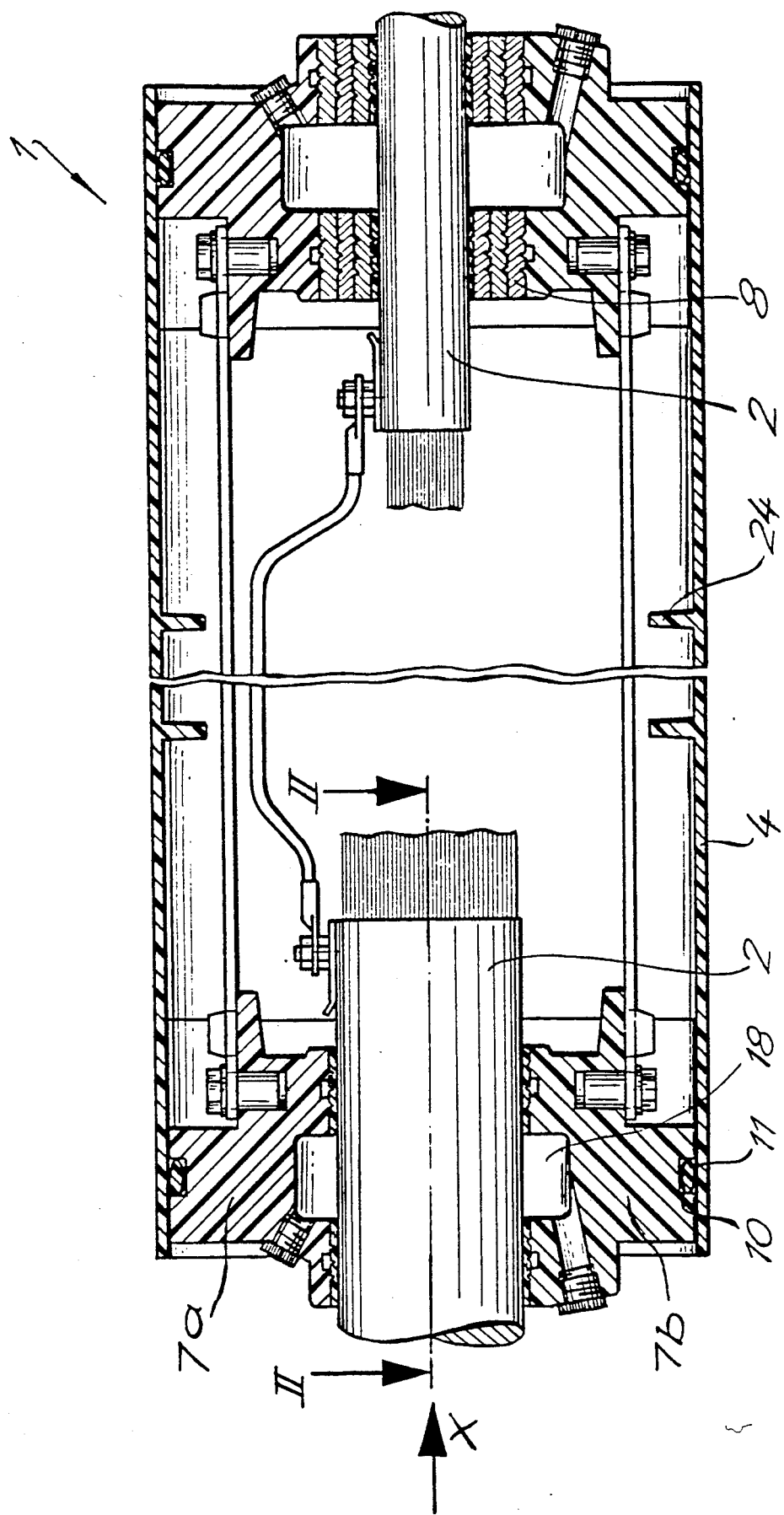
FIG. 1 is a vertical sectional view of a cable splice assembly according to the present invention.

The figures of the drawing show a cable splice assembly 1 for connecting and branching cables 2, particularly telecommunication cables, as shown in FIG. 1 and glass-fiber cables 3, as shown in FIG. 1. The cable socket 1 essentially is constructed of a longitudinally divided socket pipe 4 of bending-elastic or thermoplastic material and a longitudinal sealing element 6 which can be pressed between the abutting edges of the longitudinal division. Centrally transversely divided sealing members 7 surrounded by the pipe sleeve are mounted in the pipe sleeve to close off the end faces of the pipe sleeve. The sealing members 7 have cable passage openings 8 which can be adapted to different cable diameters.

Figure 2:
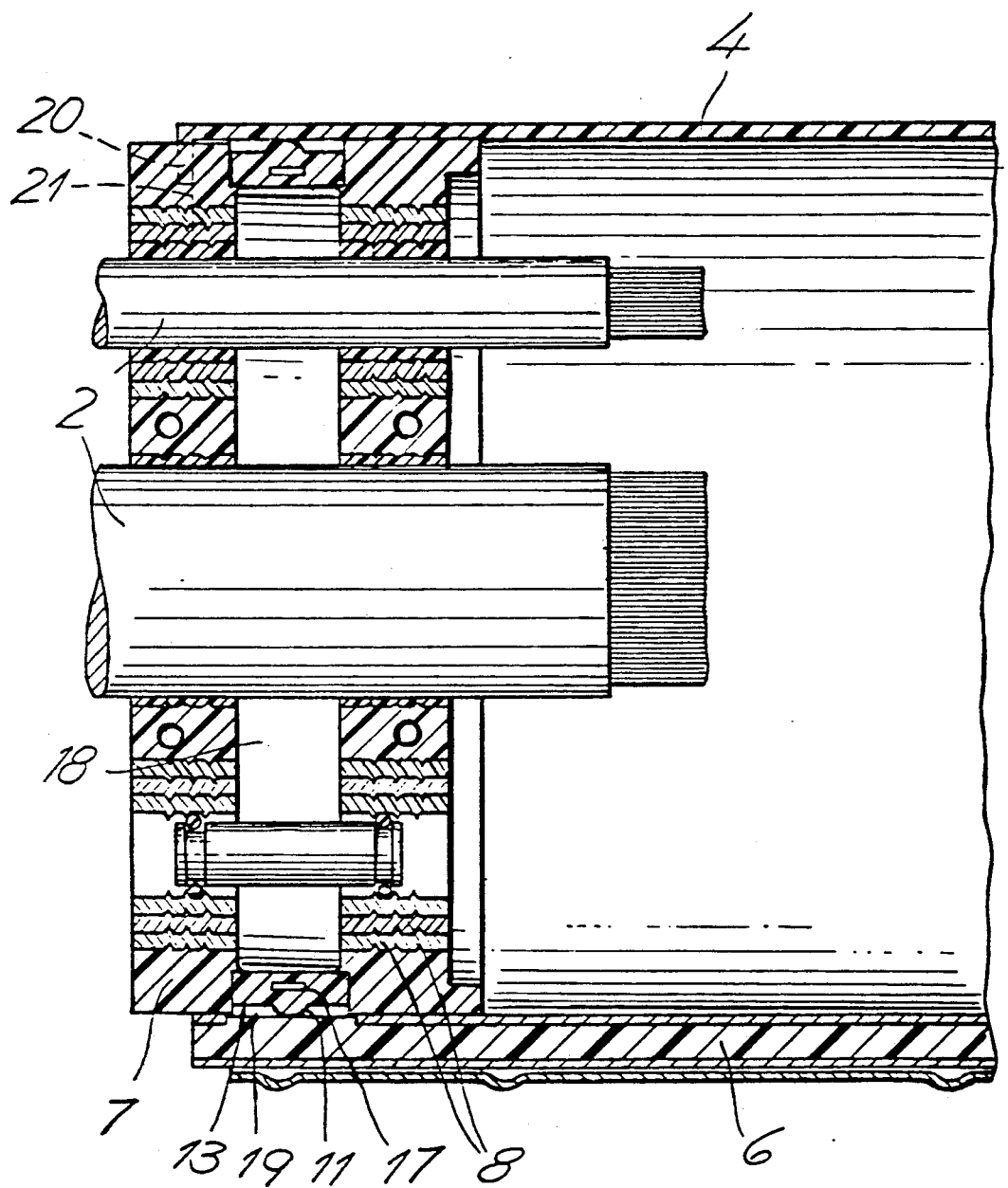
FIG. 2 is a horizontal sectional view taken along sectional line II—II of FIG. 1.
Figure 3:
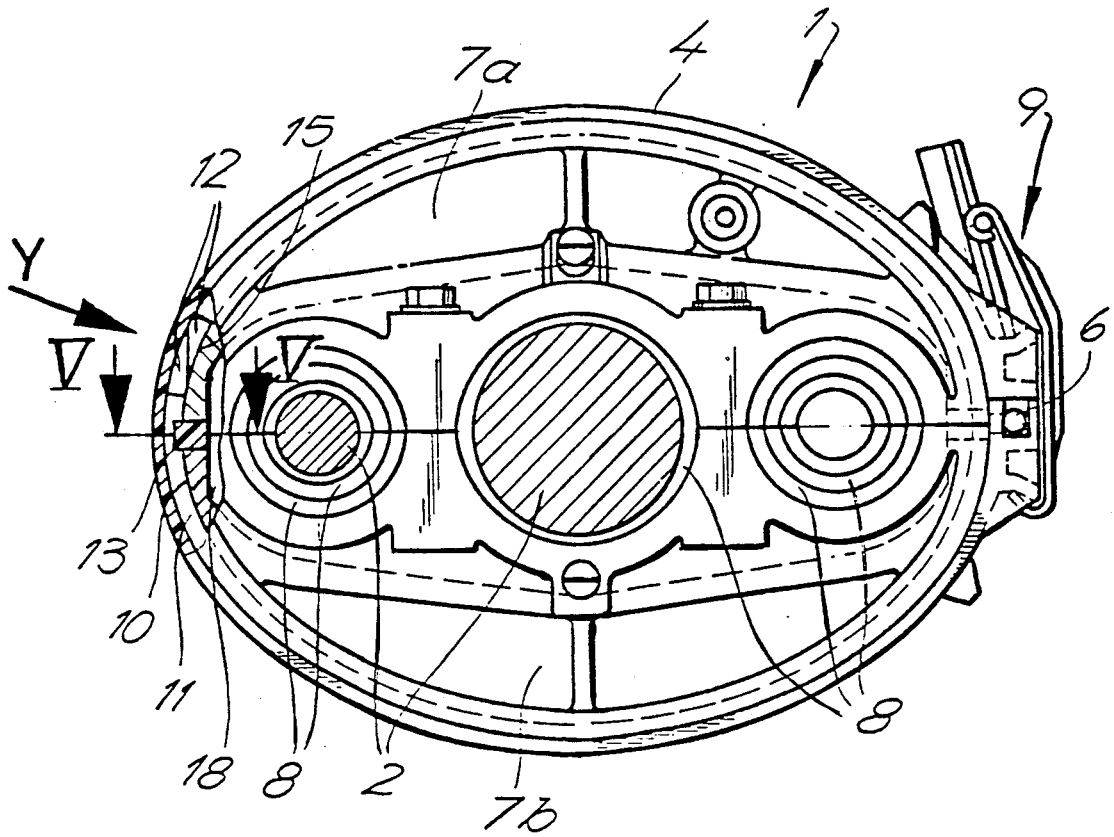
FIG. 3 is a view of the cable splice assembly of FIG. 1 in the direction of arrow X.
Figure 4:
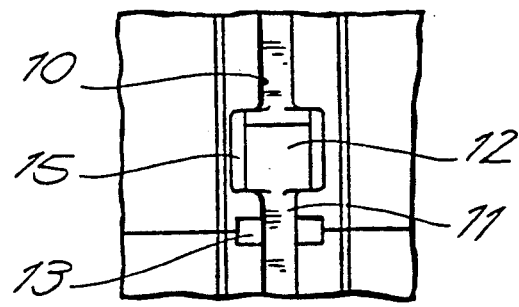
FIG. 4 is a view in the direction of arrow Y of FIG. 3 showing the area of the overlapping ends of a circumferential sealing element without pipe sleeve.
Figure 5:
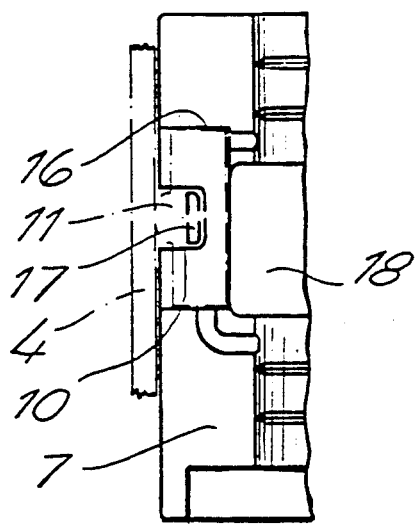
FIG. 5 is a sectional view taken along sectional line Y—Y of FIG. 3 showing a bearing recess with locking nose.
Figure 6:
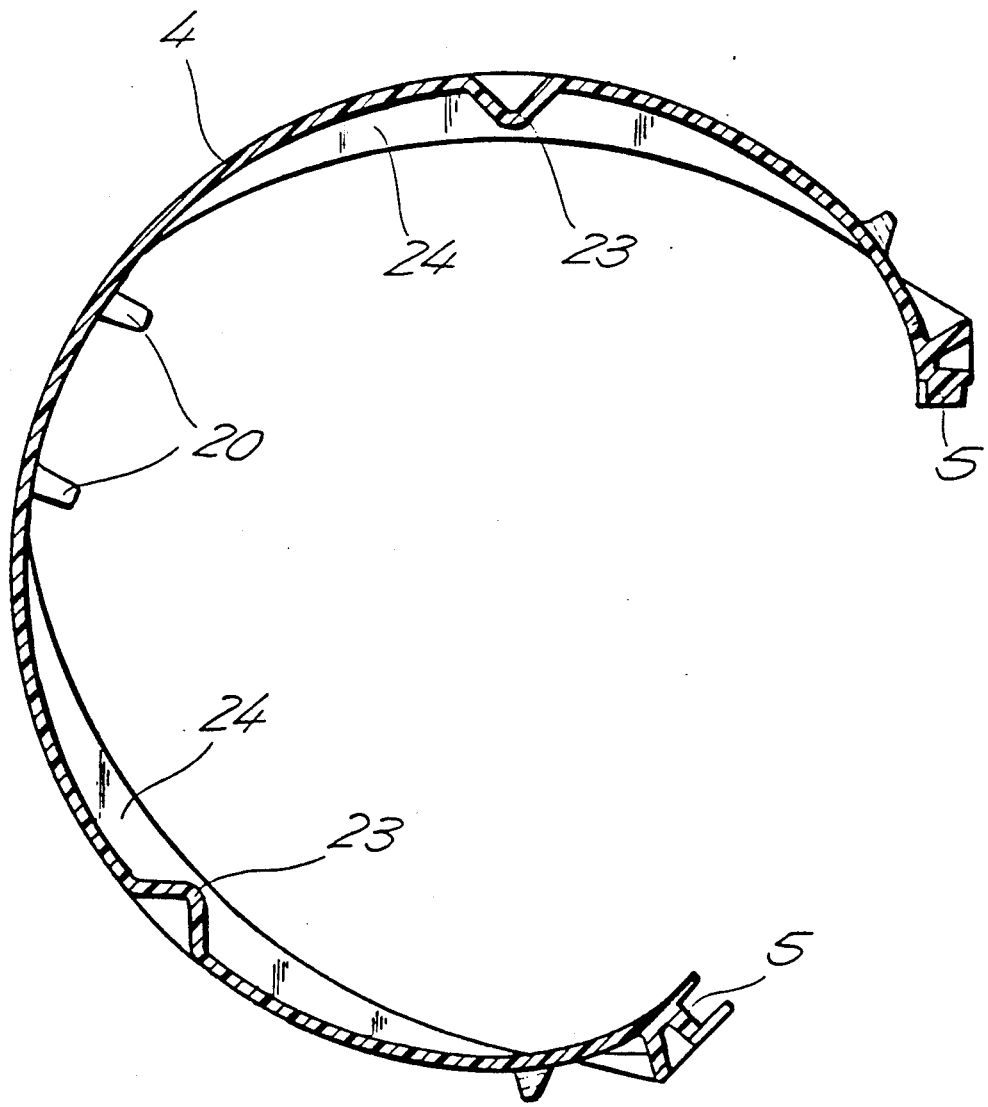
FIG. 6 is a radial sectional view of the non-assembled pipe sleeve of FIG. 1.
Figure 7:
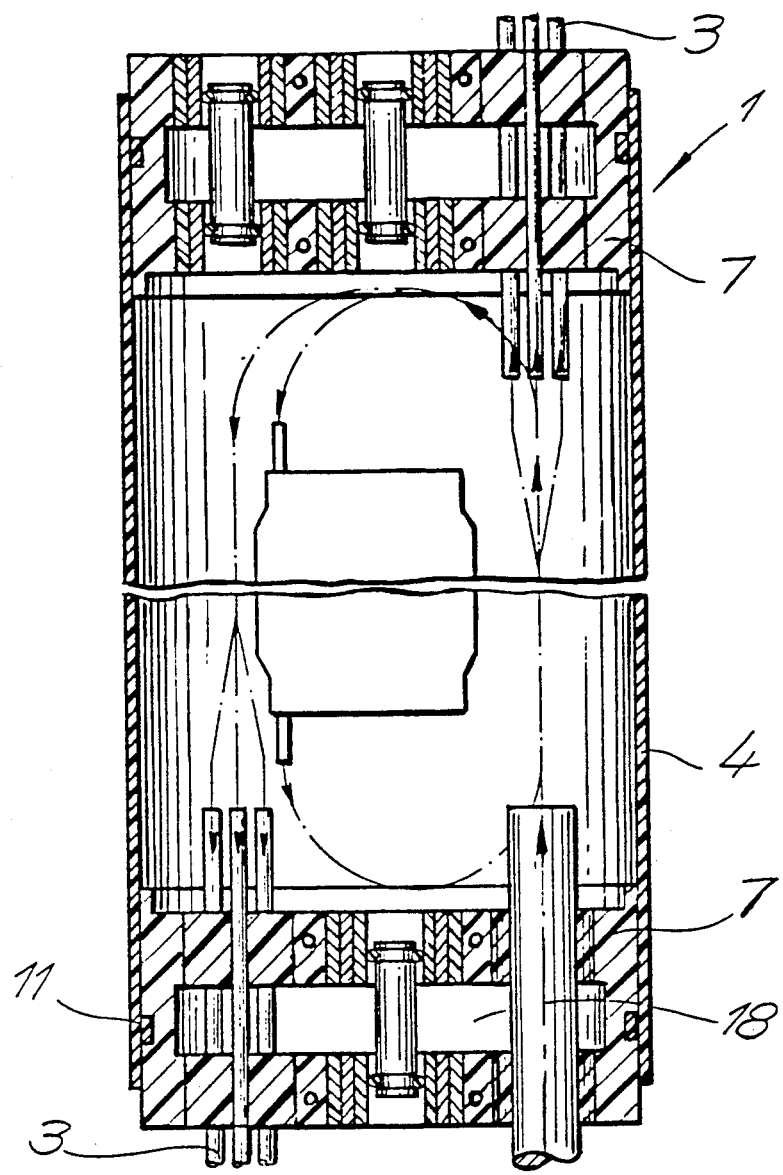
FIG. 7 is a schematic horizontal sectional view of a pipe sleeve with glass fiber cables.
Figure 8:
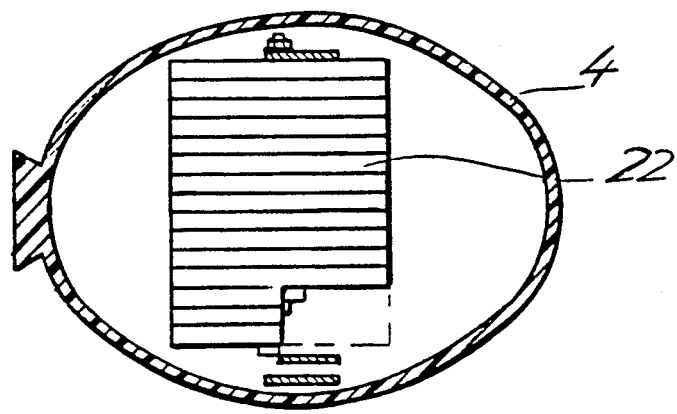
FIG. 8 is a vertical sectional view of the pipe sleeve of FIG. 7.

The splice assembly pipe 4 is closed by means of gripping closures 9 which engage behind the abutting edges 5 of the longitudinal division shown in FIG. 6. Circumferential sealing elements 11 which can be pressed into circumferential locking grooves 10 are arranged between the pipe sleeve 4 and the sealing members 7. The circumferential sealing elements are divided O-type sealing rings 11 with sealing tongues 12 which overlap at the ends where the sealing rings are divided. Each O-type sealing ring has two sealing projections 13 shown in FIGS. 2 and 3 which engage on both sides in the abutting area of the sealing member halves 7a, 7b. The sealing projections 13 have locking recesses 14. At least one sealing member half 7a has in the region of the locking groove 10 a bearing bed 15 for the overlapping sealing tongue 12 and on both sides in the abutting area a bearing recess 16 with a locking nose 17 each which engages in the locking recess 14 of the sealing projection 13 inserted in the bearing recess 16 and pressed in after the sealing member halves 7a, 7b are clamped together. The sealing tongues 12 are conically overlapping tongues. The wing-like sealing projections 13 of the O-type sealing rings 11 seal an injection chamber 18 of the sealing member 7 extending to the bearing recesses 16. This injection chamber 18 has the purpose to provide a pressure-tight seal for the cables 2.

The longitudinal sealing element 6 of the pipe sleeve 4 is also an O-type sealing ring. The O-type sealing ring 6 has integrally formed attachments shown in FIG. 11 in the areas of intersection with the circumferential sealing elements 11 of the sealing members 7, wherein the integrally formed attachment 19 can be pressed against the circumferential sealing elements 11. Accordingly, after the pipe sleeve 4 has been assembled, the integrally formed attachments are located in the region of the sealing projections 13 of the circumferential sealing elements 11 for the bearing recesses 16 provided for this purpose.

As illustrated in FIGS. 12 and 6, pipe sleeve 4 has at its two ends inwardly bent or projecting centering noses 20 which rest against centering attachments 21 integrally formed on the end face of the sealing member 7 in order to provide a locking means against rotation. The pipe sleeve 4 has an elliptic cross-section and the sealing members 7 are disks which have a corresponding elliptic shape. This ensures that sufficient interior space is available for placing glass fiber cable 3 and for the splice boxes 22 required for the glass fiber cables and for the required bending radii. Portions of the pipe sleeve 4 have stiffening corrugations 23 which extend in longitudinal direction of the pipe and/or internal stiffening ribs 24 which extend in circumferential direction as shown in FIG. 6.

As mentioned above, the pipe sleeve 4 is of a bending-elastic or thermoplastic material. Suitable materials of all components of the cable splice assembly are described, for example, in U.S. Pat. Nos. 4,558,178; 4,808,772; 4,933,512; 4,831,215; 4,704,499; 4,492,816; 4,424,412 and 3,692,926.

While a specific embodiment of the invention has been shown and described in detail to illustrate the application of the inventive principle, it will be understood that the invention may be embodied otherwise without departing from such principles.

I claim:

1. In a cable splice assembly for connecting and branching cables, particularly telecommunication cables, of different diameters, the cable splice assembly including a pipe sleeve having ends, the pipe sleeve being longitudinally divided along abutting edges, a longitudinal sealing element being pressed between the abutting edges of the longitudinally divided pipe sleeve, sealing members surrounded by the pipe sleeve being mounted at the ends of the pipe sleeve, the sealing members being transversely divided along an abutting area, the sealing members having cable passage openings adaptable to different cable diameters, circumferential sealing elements being pressed in circumferential locking grooves between the pipe sleeve and the sealing members, the improvement comprising the circumferential sealing elements being O-type sealing rings which are divided forming loose ends, the O-type sealing rings having sealing tongues which overlap at the ends, each O-type sealing ring having two sealing projections which engage in the abutting area of the sealing member halves, the sealing projections having locking recesses, at least one of the sealing member halves having at the locking groove a bearing bed for receiving the overlapping sealing tongues, and at least one of the sealing members having at the abutting edge thereof a bearing recess with a locking nose which engages the locking recess of the sealing projection which is inserted in the bearing recess.

2. The cable splice assembly according to claim 1, wherein the sealing tongues are conically overlapping tongues.

3. The cable splice assembly according to claim 1, wherein the sealing members define an injection chamber, the sealing projections being ring-shaped and integrally connected to the O-type sealing rings, such that the sealing projections seal the injection chamber.

4. The cable splice assembly according to claim 1, wherein the longitudinal sealing element is an O-type sealing ring, the longitudinal sealing element of the pipe sleeve having integrally formed attachments at areas of intersection with the circumferential sealing elements of the sealing members, the integrally formed attachments of the longitudinal sealing elements being pressed against the circumferential elements.

5. The cable splice assembly according to claim 1, wherein an end face of each sealing member has a centering attachment; the two ends of the pipe sleeve each having a centering nose, the centering noses resting against the centering attachments to secure the pipe sleeve against rotation.

6. The cable splice assembly according to claim 1, wherein an end face of the sealing member has a centering recess, the pipe sleeve having at both ends thereof projecting centering noses, the centering noses engaging in the centering recesses to secure the pipe sleeve against rotation.

7. The cable splice assembly according to claim 1, wherein the pipe sleeve has an elliptic cross-section and the sealing members are disks having an elliptic shape.

8. The cable splice assembly according to claim 1, wherein the pipe sleeve has over portions thereof stiffening corrugations which extend in longitudinal direction of the pipe sleeve.

9. The cable splice according to claim 1, wherein the pipe sleeve has over portions thereof internal stiffening ribs which extend in circumferential direction of the pipe sleeve.

* * * * *